United States Patent
Bonino (10) Patent No.: US 9,595,819 B1
(45) Date of Patent: Mar. 14, 2017

(54) HINGED MUD RING COVER AND METHOD OF USE

(71) Applicant: Aerionics, Watertown, SD (US)

(72) Inventor: Steven R Bonino, Brandon, SD (US)

(73) Assignee: Aerionics, Inc., Watertown, SD (US)

( * ) Notice: Subject to any disclaimer, the term of this patent is extended or adjusted under 35 U.S.C. 154(b) by 0 days.

(21) Appl. No.: 15/132,811

(22) Filed: Apr. 19, 2016

Related U.S. Application Data (60) Provisional application No. 62/221,230, filed on Sep. 21, 2015.

(51) Int. Cl.
*H02G 3/08* (2006.01)
*H02G 3/14* (2006.01)

(52) U.S. Cl.
CPC .............. *H02G 3/081* (2013.01); *H02G 3/14* (2013.01)

(58) Field of Classification Search
USPC .................................................. 174/50, 520
See application file for complete search history.

(56) References Cited

U.S. PATENT DOCUMENTS

| 5,931,325 | A | 8/1999 | Filipov |
| 6,583,359 | B1 * | 6/2003 | Cabello-Colon ........ H02G 3/14 174/55 |
| D555,108 | S | 11/2007 | Strong |
| 7,468,486 | B2 | 12/2008 | Yan |
| 7,645,936 | B2 | 1/2010 | Magno |

* cited by examiner

*Primary Examiner* — Dhirubhai R Patel
(74) *Attorney, Agent, or Firm* — Mark Ekse (57) ABSTRACT

A Hinged Mud Ring Cover and Method of Use for providing a hinged intermediate mounting surface on which a device may be installed prior to being wired. The Hinged Mud Ring Cover generally includes a box mounting plate with an access aperture operationally coupled to an electrical box, the access aperture facilitating access to an interior of the electrical box when the box mounting plate portion is coupled to the electrical box, and a device mounting plate portion hinged to the box mounting plate portion for mounting the device allowing the use of both hands for wiring the device.

20 Claims, 7 Drawing Sheets

HINGED MUD RING COVER AND METHOD OF USE

BACKGROUND OF THE INVENTION

Field of the Invention

The present invention relates to mud rings and more particularly pertains to a new Hinged Mud Ring Cover and Method of Use for providing a means of mounting a device to be installed on an intermediary plate to facilitate ease of wiring and provide additional safety for the device and the installer.

Description of the Prior Art

The use of mud rings is known in the prior art. More specifically, mud rings heretofore devised and utilized are known to consist basically of familiar, expected and obvious structural configurations. Illustrative examples of known prior art include the following:

U.S. Pat. No. 5,931,325 issued to Filipov on Aug. 3, 1999;
U.S. Pat. No. 7,645,936 issued to Magno on Jan. 12, 2010;
U.S. Pat. No. 7,468,486 issued to Yan on Dec. 23, 2008;
US Patent No. D555, 108 issued to Strong on Nov. 13, 2007.

Each of these illustrative example of prior art provide basic mud ring functionality in providing an interface between electrical boxes, which are typically installed prior to the installation of wall surface materials, and the user interface portion of the device to be installed, such as an outlet, switch, sensor, or other similar device.

When working inside of an electrical box, on wiring or connections for example, it is difficult to complete that work with one hand while holding the device being connected to or mounted on the electrical box in the other hand.

Performing an installation of this nature with a standard mud-ring can be time consuming, inefficient or even unsafe. The device can be dropped connection wires can be damaged or the job may require an additional user to simply hold the device.

In these respects, the Hinged Mud Ring Cover and Method of Use according to the present invention substantially departs from the conventional concepts and designs of the prior art, and in so doing provides an apparatus primarily developed for the purpose of providing a hinged intermediate mounting surface on which a device may be installed prior to the device being wired in place.

Using the hinged mud-ring electrical box cover, the device is installed and is suspended by the electrical box allowing simultaneous access to the front and rear (wired end) of the device during completion of the installation set-up or wiring process. The user is also free to use both hands to complete the installation.

SUMMARY OF THE INVENTION

In view of the foregoing disadvantages inherent in the known types of mud rings now present in the prior art, the present invention provides a new Hinged Mud Ring Cover construction wherein the same can be utilized for improving the speed and safety of device installation and device setup or maintenance.

As stated above, when working inside of an electrical box, on wiring or connections for example, it is difficult to complete that work with one hand while holding the device being connected to or mounted on the electrical box in the other hand. The invention claimed here solves this problem.

The hinged mud-ring electrical box cover enables the user to mount the electrical or data device to the mud-ring, then swing open the mud-ring and complete the wiring and connections or other operations with both hands. When the installation is complete, the user can simply swing the hinged mud-ring closed over the electrical box and lock it in place.

The claimed invention differs from what currently exists. A standard mud-ring is an electrical box cover designed to house and protect electrical wiring, switches, receptacles and other electrical or data devices. Device mounting holes are pre-tapped to accept device fasteners. The mud-ring is fastened to the electrical box with mounting screws. This invention differs from what currently exists in that the device, once mounted to the hinged mud-ring, is suspended by the electrical box allowing simultaneous access to the front and rear of the device during completion of the installation, set-up or wiring process. With a standard mud-ring there is no access to the rear (wired end) of the device once it is mounted to the electrical box. Though there are standard mud-rings and general purpose hinged covers or hinged weather proof electrical box covers, there are no similar inventions to date.

This invention is an improvement on what currently exists. This invention facilitates installation and maintenance of devices mounted on mud-rings and installed on to electrical boxes. With conventional mud-rings there is no access to the rear (wired end) of the device once the mud-ring is installed on the electrical box. The user must remove the mud-ring and device from the electrical box and either hold the device in one hand while working with the other hand, let the device hang from wire connections, have another user hold the device being installed or set the device down someplace. This invention allows for hands-free completion and total attention to the installation.

In the event that the user needs to read installation instructions perform discreet adjustments or focus on detail during the installation process, holding onto the device with one hand, constantly setting down and picking up or hanging the device during the installation process can be distracting, frustrating or even unsafe.

Using the hinged mud-ring the user is unfettered and can use both hands and focus on the job at hand. The user can read installation instructions while observing the device or making connections or adjustments and there is no need for a second user to hold the device and there is no chance that the device will be dropped or the wires damaged.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
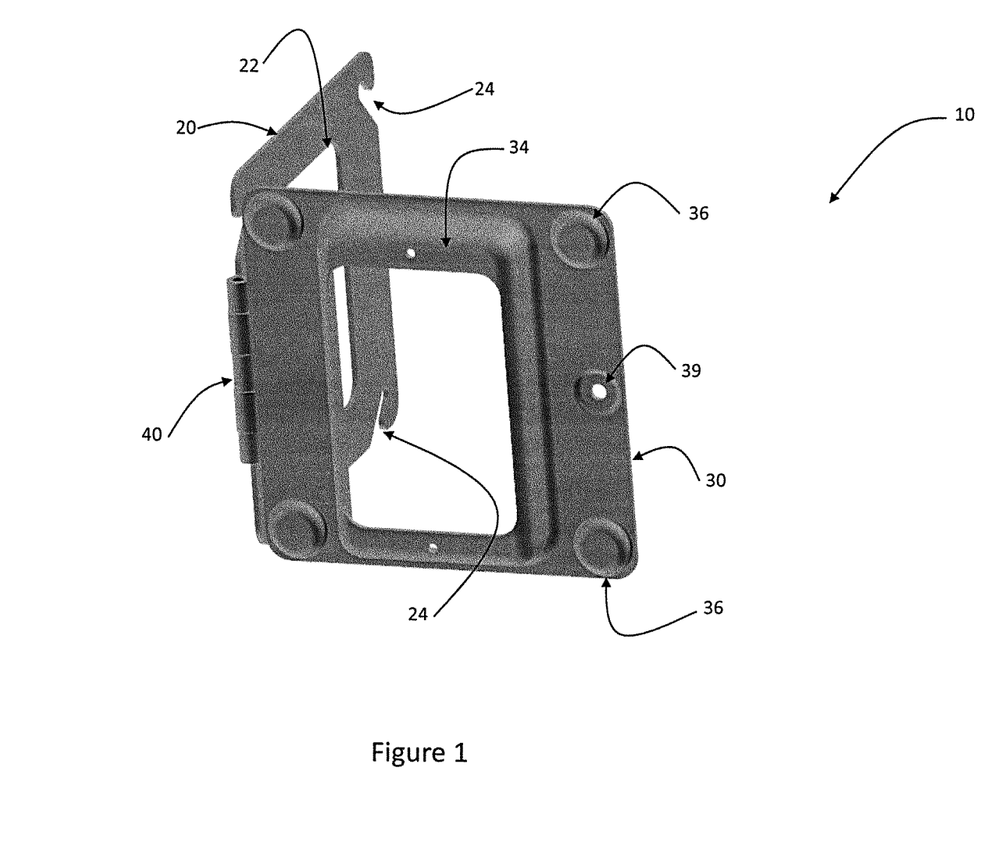
FIG. 1 is a schematic isometric view of a new Hinged Mud Ring Cover and Method of Use according to the present invention.
Figure 2:
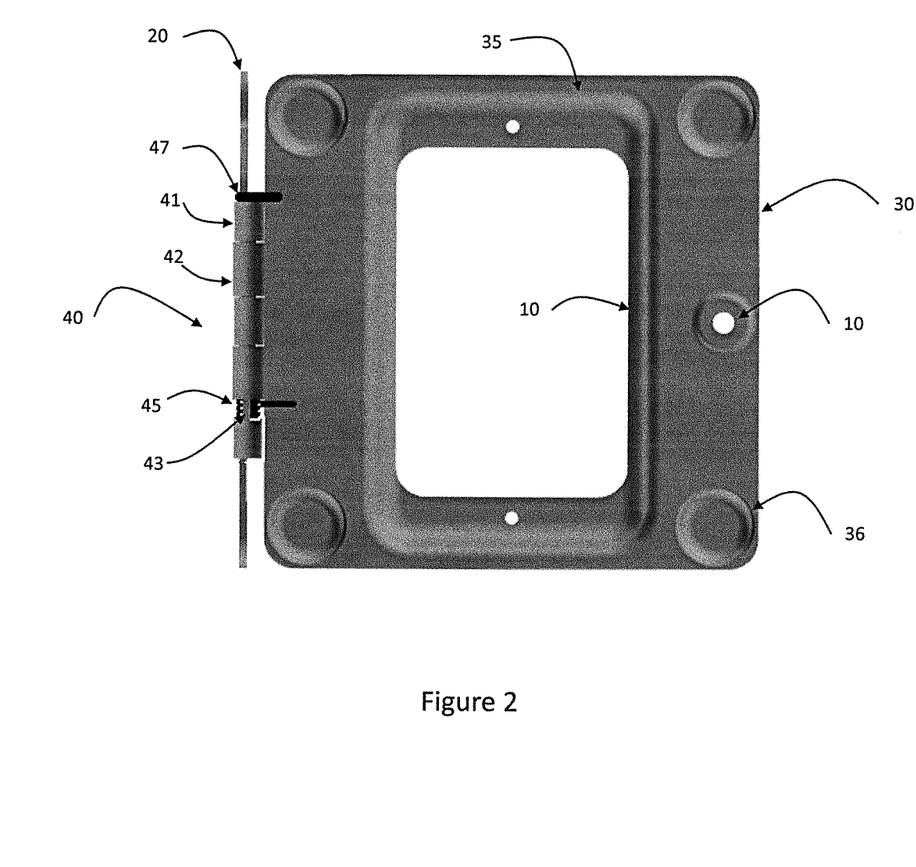
FIG. 2 is a schematic front view of the present invention.
Figure 3:
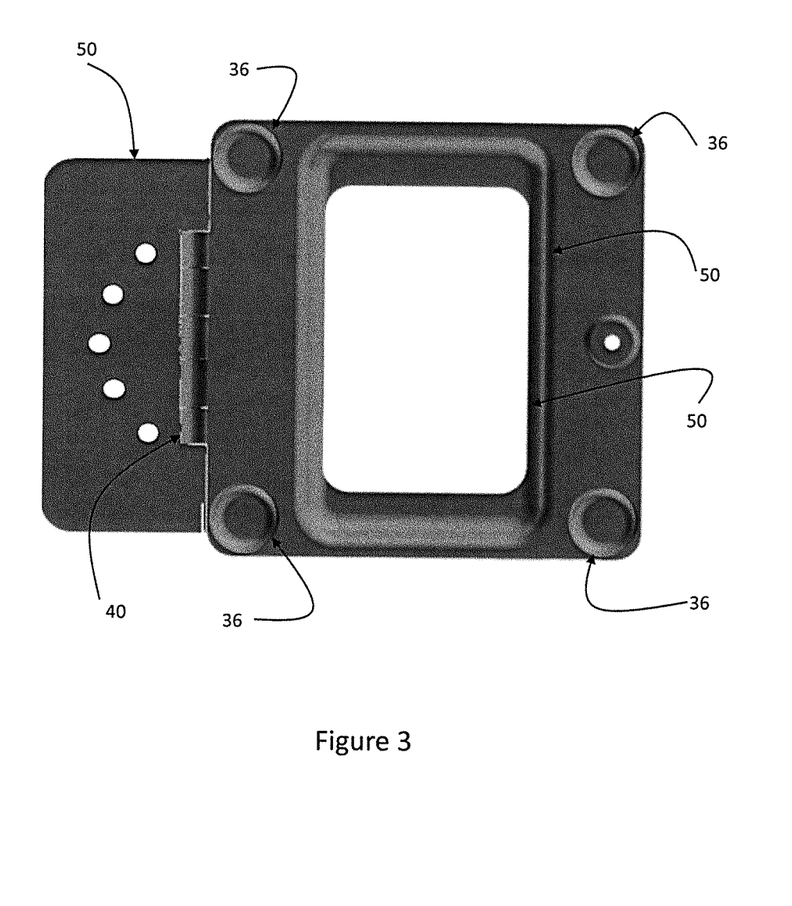
FIG. 3 is a schematic side view of the present invention.
Figure 4:
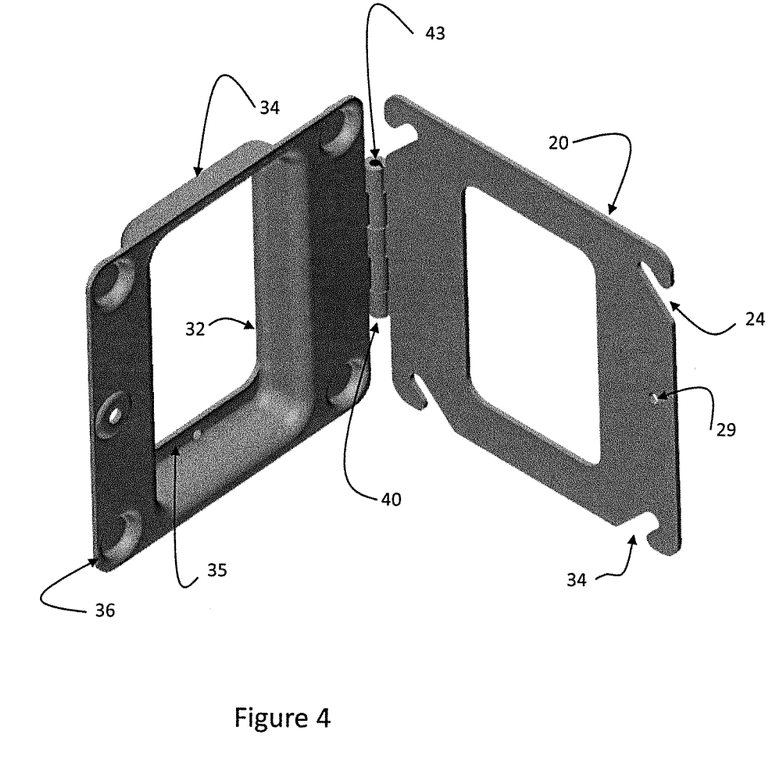
FIG. 4 is a schematic side view of the present invention.
Figure 5:
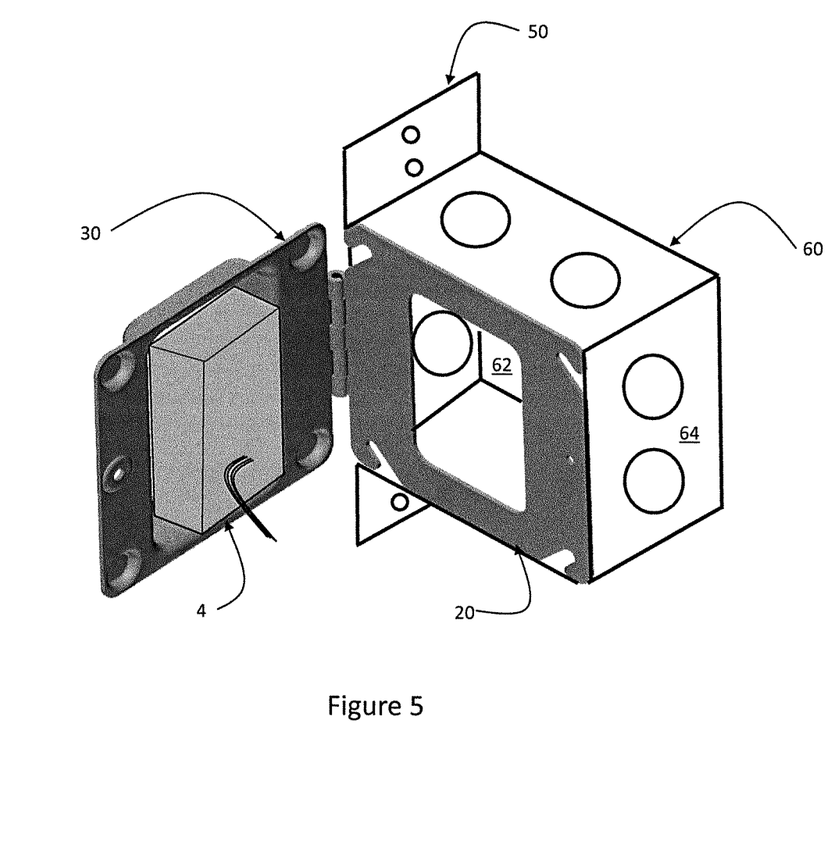
FIG. 5 is a schematic isometric view of and embodiment of the present invention.
Figure 5A:
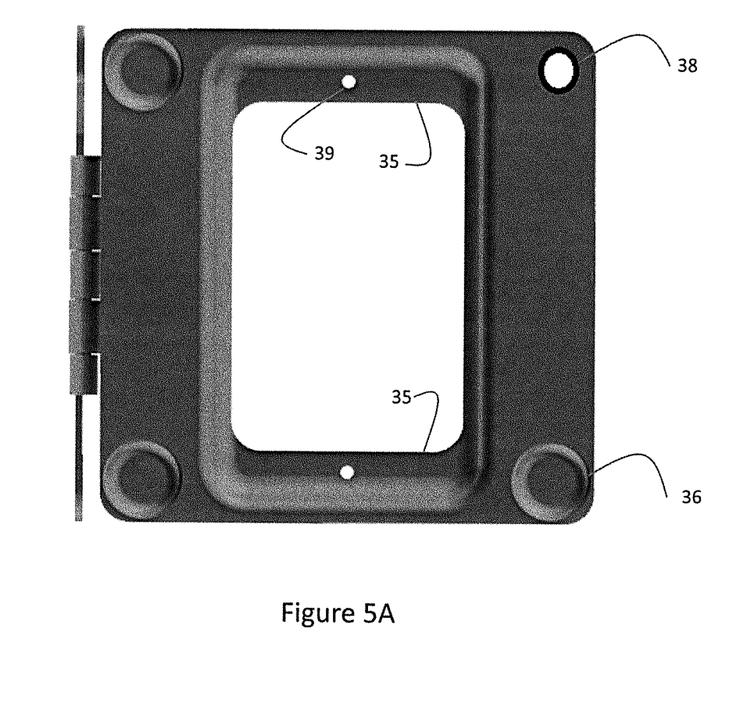
FIG. 5a is a schematic side view of the present invention.
Figure 5B:
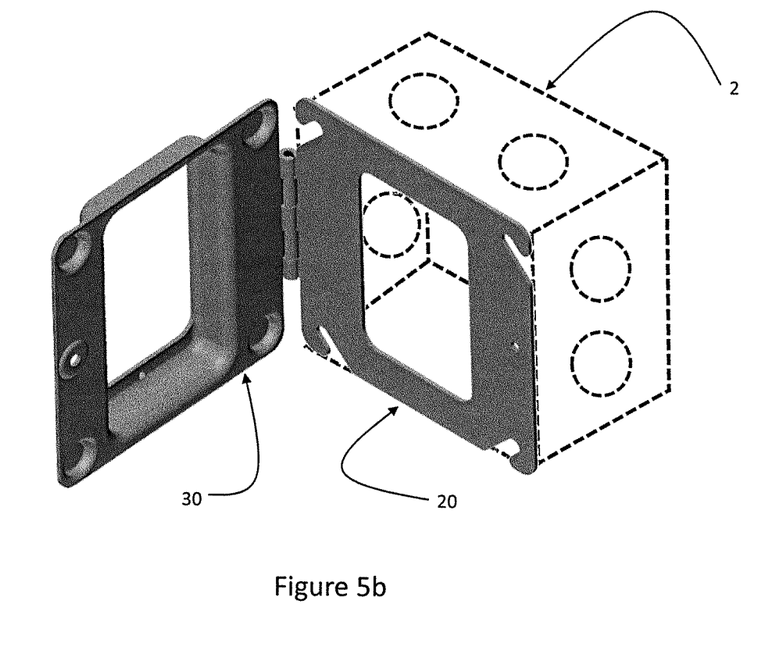
FIG. 5b is a schematic isometric view of an embodiment of the present invention.

With reference now to the drawings, and in particular to FIGS. 1 through 5b thereof, a new Hinged Mud Ring Cover embodying the principles and concepts of the present invention and generally designated by the reference number 10 will be described.

As best illustrated in FIGS. 1 through 5b, the Hinged Mud Ring Cover 10 generally comprises a box mounting plate portion 20 and a device mounting plate portion 30. For the purposes of improving the ease of reading of this specification, the "box mounting plate portion" may be referred to as the "box mounting plate". Similarly, the "device mounting plate portion" may be referred to as the "device mounting plate". The box mounting plate 20 may be coupled to or mounted to an electrical box 2. The box mounting plate 20 typically includes an access aperture 22 for facilitating access to an interior of the electrical box 2 when the box mounting plate 20 is mounted to the electrical box 2. The device mounting plate 30 may be coupled to the box mounting plate 20. The device mounting plate typically includes a device access aperture 32 for facilitating access to a back side of a device 4 to be mounted to the device mounting plate 30. However, the present invention also contemplates embodiments in which the device mounting plate 30 does not include a device access aperture, and instead is designed to merely close the mud ring rather than mounting a device.

While the box mounting plate 30 may include at least one mounting slot 24 or mounting aperture for selectively coupling the box mounting plate 20 to the electrical box 2. It is generally preferred that the box mounting plate 20 include four mounting slots 24, each positioned adjacent to an associated corner to facilitating mounting the box mounting plate 20 to the electrical box 2 using standard screws.

It is important to note, that while the standard screw/slot configuration described above is a preferred configuration, it is possible to use one or more plate securing means to either selectively or permanently couple the box mounting plate to the electrical box. Illustrative examples of such securing means include the combination of a press fit fastener with an aperture, spring clips, slot and tab configurations, zip tie type fasteners, and other suitable mechanical fasteners.

Preferably, the device mounting plate 30 includes a mud ring segment 34 which extends outwardly along a perimeter edge 33 of the device access aperture 32. This mud ring segment 34 can be sized for a variety of depths and purposes. It is conceived by the present invention that the mud ring portion 34 may be a separate component which is coupled to the device mounting plate 30.

In at least one preferred embodiment, the mud ring segment 34 further includes a pair of device mounting flanges 35 extending from opposite ends of the mud ring segment 34, and that each device mounting flange 35 include a threaded aperture to facilitate the mounting of a device onto the device mounting plate 30.

Preferably, the device mounting plate 30 is hinged to the box mounting plate 20. This can be accomplished by using a hinge formed in part 41 on the box mounting plate 20 and in part 42 on the device mounting plate 30 with a rod 43 serving as a coupling between the two hinge portions 41, 42, by a separate hinge 40 which is coupled to both the box mounting plate 20 and the device mounting plate 30, or by a living hinge when the hinged mud ring cover 10 is formed from a polymeric material. Additionally, it is possible to use a tab and slot arrangement to provide a pivotal connection without an actual "hinge" without departing from the scope of the invention.

The present invention may also include a spring member 45 used in conjunction with the hinge to either urge the device mounting plate 30 into a normally open or a normally closed position relative to the box mounting plate 20. The normally closed position is defined as the device mounting plate 30 substantially abutting the box mounting plate 20. The normally open position is defined as the device mounting plate 30 being positioned away from the box mounting plate 20.

Further, the present invention may also utilize a stop member 47 to inhibit over-travel of the hinge beyond a designated position.

In a further preferred embodiment the device mounting plate 30 further includes four embossed screw relief portions 36 for covering screws used to mount the box mounting plate 20 to the electrical box, when the device mounting plate 30 is in a closed position relative to the box mounting plate 20.

In yet a further embodiment, the device mounting plate 30 includes at least one slot or aperture 38 substantially aligned with one of the mounting slots 24 or mounting apertures of the box mounting plate 20. Thus, the device mounting plate 30 may be held in a closed position relative to the box mounting plate 20 by one or more screws.

In an alternate but also preferred embodiment the box mounting plate 20 further includes a threaded aperture 29 adjacent to an edge of the box mounting plate 20 and the device mounting plate 30 further includes an aperture 39 adjacent to an edge of the device mounting plate 30 and substantially aligned with the threaded aperture 29 of the box mounting plate 20 when the device mounting plate 30 is in a closed position relative to said box mounting plate 20. A screw is selectively positioned through the aperture 39 of the device mounting plate 30 and the threaded aperture 29 of the box mounting plate to hold the plates in a closed position.

Additionally, it should be noted that the present invention also contemplates configurations in which alternate securing means are used to hold the device mounting plate in a closed positon relative to the box mounting plate. Illustrative examples of such securing means include the combination of a press fit fastener with an aperture, spring clips, slot and tab configurations, zip-tie type fasteners, and other suitable mechanical fasteners.

In at least one further embodiment, the box mounting plate 20 further includes a stud mounting segment 50 for selectively securing the box mounting plate 20 to a stud or other support structure. This allows the hinged mud ring cover 10 to be used in applications with or without an electrical box, such as low voltage applications.

The present invention also contemplates embodiments in which the device mounting plate 30 is hinged or otherwise pivotally coupled to an electrical box 60 directly. This may either be implemented through mechanical means or as a living hinge in instances in which the electrical box 60 and the device mounting plate 30 are integrally formed from a polymeric material.

While the foregoing discussion has been addressed in terms of generally rectangular implementations of electrical boxes, it should be understood by those skilled in the art that the present invention is immediately applicable with implementations for electrical boxes which are generally octagonal, square, round, or other geometric shapes.

Now, turning to one further preferred embodiment, as an illustrative example only and not for purposes of limitation, we will discuss the basic manufacturing, assembly, and use of an embodiment of the present invention.

The Illustrative Example of The Invention Discussed Below Includes:
1. Mud-ring ("Device Mounting Plate")
2. Flat Mounting Plate ("Box Mounting Plate")
3. Hinge Pin
4. Locking Screw
5. Mounting Screws (4)

The mud-ring has two rolled hinge knuckles, half swaged and forms one leaf of the hinge assembly. The mud-ring also has a thru hole in a recess to accommodate the locking screw and two threaded mounting holes to accommodate the installation of an external device. The mud-ring has four round recess features to accommodate the heads of the mounting screws which are oriented beneath the recesses when the assembly is in the closed position. The mud ring has a large rectangular opening, in the center through which wires, connections or devices can pass through to an electrical box.

The flat mounting plate has three rolled hinge knuckles, half swaged and forms the second leaf of the hinge. The flat mounting plate has four slots through which it can be fastened to an electrical box using the mounting screws. The flat mounting plate also has a threaded hole to accommodate the locking screw. The flat mounting plate has a large rectangular opening in the center through which wires, connections or devices can pass through to an electrical box.

The Hinge Pin is inserted through the two hinge knuckles of the mud-ring and the three hinge knuckles of the flat mounting plate joining the two halves of the hinge formed by the mud-ring and the flat mounting plate.

The Locking Screw passes through the mud-ring locking screw hole and is inserted into the flat mounting plate threaded locking screw hole to fasten the hinge assembly in the closed position.

The Mounting Screws pass through the slots in the flat mounting plate and fasten the flat mounting plate to an electrical box.

When the locking screw of the hinged mud-ring electrical box cover is removed, the hinged mud-ring assembly can be opened exposing the slots of the flat mounting plate. The flat mounting plate can be fastened to an electrical box by installing the mounting screws through the slots and into to the electrical box. An electrical device can then be installed on to the mud-ring using the two threaded mud-ring mounting holes. Wiring, connections and other installation operations of the electrical device can now be completed on both the front and rear of the device, with two hands, while the hinged mud-ring electrical box cover is in the opened position. When the installation operations are complete, the user can swing the hinged mud-ring closed over the electrical box. The locking screw can now be installed through the mud-ring locking screw hole and inserted into the flat mounting plate locking screw hole to fasten the hinged mud-plate assembly in the closed position. If any maintenance has to be completed in the future the locking screw can be removed and the hinged mud-ring electrical box cover can be swung open for access to the electrical device, adjustments and connections.

How to Make the Invention

Sheet metal fabrication is used to make articles in metal or alloy sheets within a range from 10 Gauge (3.25 mm) to 32 Gauge (0.274 mm). Sheet metal fabrication includes cutting shaping and forming of sheet metals by use of punching machines and presses. The manufacturing processes of sheet metal parts can be classified in material removal and material deformation. Material removal process can be a stage of creating a 2D shape such as a development of a sheet metal part by punching, notching, or nibbling. Deformation process can be a stage of bending or stretch sheet metal part into a 3D complex shape.

Mud-Ring
    Shear—Shear flat material in desired strip widths
    Blank—Cut out approximate outside shape of part
    Draw—Draw large rectangular shape 0.600 deep
    Emboss—Form (4) round recesses
    Emboss—Form lock screw recess
    Punch—Cut out large rectangular opening and (3) round holes
    Blank Trim—Cut outside periphery to exact shape
    Form—Form curl hinge (3 hits}
    Tap—Tap (2) holes Flat Mounting Plate
    Shear—Cut flat material into desired strip widths
    Blank—Cut flat material to outside shape of part
    Punch—Cut out large rectangular opening and (4) slots
    Form—Form curl hinge (3 hits)
    Tap—Tap (1) hole Assembly
1. Assemble Mud-Ring Plate, Flat Mounting Plate and Hinge Pin Since this is a relatively simply assembly and mechanism most of the elements are necessary. That being said, the mounting screw recesses in the mud-ring could be eliminated if flat head as opposed to pan head screws were used to fasten the flat mounting plate to an electrical box so as not to cause interference between the mounting screws and the mud-ring. The locking screw recess could also be eliminated as its value is mostly aesthetic. The locking screw could be a tamper proof type screw to add extra security and protect the assembly and electrical box.

There are many types of hinges that can be employed by an assembly like this. A Slip Joint Hinge can be used for easy removal of the mud-plate from the Flat mounting plate. A "Stop" function can be added to hinge to limit its rotation. A Spring Hinge could be used to hold the mud-ring in an open or closed position. The hinge could also be arranged on the top, bottom or side. If a flexible material or plastic like polypropylene were to be the material used a "living hinge" could also be employed.

There are many shapes, types and sizes of electrical box covers or mud-rings that could be utilized for this invention. This example uses the basic form of a 4" Square Mud-Ring, for 1 device, flat and a 4" Square Mud-Ring, for 1 device, raised 5/8" with a hinge in between. This design could be used for any electrical box cover including outlet covers, junction box covers, switch covers, etc. and with various sizes and types; single-gang, 2-gang, 4-gang, etc. The hinged mud-ring could be integrated with the electrical box itself directly rather than with the flat mounting plate then to the electrical box. There would also be opportunity to use different materials in addition to standard steel, galvanized steel and stainless steel, plastic, carbon fiber, etc.

How to Use the Invention:

When working inside of a standard electrical box, on wiring or connections for example, it is difficult to complete that work with one hand while holding the device being connected to or mounted on the electrical box in the other hand. This invention enables the user to mount an electrical or data device to an electrical box while maintaining hands-free access to the inside of the box and back side of the device.

The user simply opens hinged mud-ring electrical box cover and mounts the flat mounting plate to the electrical box with the hinge side to the left. The user then installs the device to the hinged mud-ring. With the mud-ring in the open position the user can then complete the wiring, connections or any other operations with both hands while the device is suspended by the hinged mud-ring electrical box cover. When the installation is complete, the user simply swings the hinged mud-ring closed over the wiring and electrical box and locks it in place in the closed position with the locking screw. Step by step instructions are as follows:

1. Remove the locking screw of the hinged mud-ring electrical box cover.
2. Open the hinged mud-ring assembly to expose the mounting slots of the flat mounting plate.
3. Fasten the flat mounting plate to the electrical box (hinge side to the left) by installing the mounting screws through the mounting slots and into to the electrical box.
4. Install the electrical device on to the mud-ring using the two threaded mud-ring mounting holes.

Note: Wiring, connections and other installation operations of the electrical device can now be completed, with two hands, while the hinged mud-ring electrical box cover is in the opened position.

5. When the installation operations are complete, swing the hinged mud-ring closed over the electrical box.
6. Install the locking screw through the mud-ring locking screw hole and inserted into the flat mounting plate threaded locking screw hole to fasten the hinged mud-plate assembly in the closed position.

Note: If any maintenance has to be completed in the future the locking screw can be removed and the hinged mud-ring electrical box cover can be swung open for access to the electrical device, adjustments and connections.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

2. electrical box
4. device
10. Hinged Mud Ring Cover
11.
12.
13.
14.
15.
16.
17.
18.
19.
20. BOX MOUNTING PLATE
21.
22. Access aperture
23.
24. Mounting slot/aperture
25.
26.
27.
28.
29. aperture
30. DEVICE MOUNTING PLATE
31.
32. Device Access Aperture
33. Perimeter Edge
34. Mud Ring Segment
35. Device Mounting Flange
36. Screw Relief Portion
37.
38. Aperture
39. Aperture
40. HINGE
41. Hinge Portion
42. Hinge Portion
43. Rod
44.
45. Spring Member
46.
47. Stop Member
48.
49.
50. Stud Mounting Segment
51.
52.
53.
54.
55.
56.
57.

58.
59.
60. Electrical Box
61.
62. Back Wall
63.
64. Perimeter Wall
65.
66.
67.
68.
69.
70.
71.
72.
73.
74.
75.
76.
77.
78.
79.

I claim:

1. A hinged mud ring electrical box cover comprising:
a box mounting plate operationally coupleable to an electrical box, said box mounting plate having an access aperture therethrough for facilitating access to an interior of the electrical box when the box mounting plate is coupled to the electrical box;
a device mounting plate operationally coupleable to said box mounting plate, said device mounting plate further comprising a mounting plate with a threaded aperture for operationally coupling an electrical device to said device mounting plate.

2. The hinged mud ring electrical box cover of claim 1, wherein said box mounting plate having at least one mounting slot or mounting aperture therethrough for coupling said box mounting plate to the electrical box.

3. The hinged mud ring electrical box cover of claim 1 wherein said box mounting plate having at least one plate securing means for securing said box mounting plate to the electrical box.

4. The hinged mud ring electrical box cover of claim 1, wherein said device mounting plate having a device access aperture therethrough for facilitating access to a back side of a device to be mounted to said device mounting plate and said device mounting plate further comprises a mud ring segment extending outwardly along a perimeter edge of said device access aperture.

5. The hinged mud ring electrical box cover of claim 4, wherein said device mounting plate further comprises a pair of device mounting flanges extending from opposite ends of said mud ring segment, said device mounting flanges having a threaded aperture extending therethrough for receiving a mounting screw whereby a device is secured to said device mounting plate.

6. The hinged mud ring electrical box cover of claim 1, wherein said box mounting plate has four mounting slots or mounting apertures or combination thereof for coupling said box mounting plate to the electrical box with at least one screw.

7. The hinged mud ring electrical box cover of claim 6, wherein said device mounting plate is pivotally coupled to said box mounting plate.

8. The hinged mud ring electrical box cover of claim 6, wherein said device mounting plate is pivotally coupled to said box mounting plate by a living hinge with the device mounting plate and the box mounting plate being integrally formed.

9. The hinged mud ring electrical box cover of claim 6, wherein said device mounting plate further comprises four embossed screw relief portions for covering the at least one screw when the device mounting plate is in a closed position relative to the box mounting plate.

10. The hinged mud ring electrical box cover of claim 6, wherein said device mounting plate further comprises at least one slot or aperture substantially aligned with one of the mounting slots or mounting apertures of the box mounting plate whereby the device mounting plate may be held in a closed position relative to the box mounting plate by one or more screws.

11. The hinged mud ring electrical box cover of claim 6, further comprising:
wherein said box mounting plate further comprises the threaded aperture adjacent to an edge of the box mounting plate;
wherein said device mounting plate further comprises an aperture adjacent to an edge of said device mounting plate and substantially aligned with said threaded aperture of said box mounting plate when said device mounting plate is in a closed position relative to said box mounting plate; and
a screw selectively positionable through the said aperture of said device mounting plate and said threaded aperture of said box mounting plate.

12. The hinged mud ring electrical box cover of claim 6, further comprising a securing means for securing said device mounting plate in a closed position relative to said box mounting plate.

13. The hinged mud ring electrical box cover of claim 1, wherein said box mounting plate further comprises a stud mounting segment for selectively securing said box mounting plate to a stud or other support structure.

14. The hinged mud ring electrical box cover of claim 1, further comprising:
wherein said device mounting plate having a device access aperture therethrough for facilitating access to a back side of a device to be mounted to said device mounting plate and said device mounting plate further comprises a mud ring segment extending outwardly along a perimeter edge of said device access aperture;
wherein said device mounting plate further comprises a pair of device mounting flanges extending from opposite ends of said mud ring segment, each of said device mounting flanges having a threaded aperture extending therethrough for receiving a mounting screw whereby a device is secured to said device mounting plate;
wherein said box mounting plate has four mounting slots or mounting apertures or combination thereof for coupling said box mounting plate to the electrical box with at least one screw;
wherein said device mounting plate is pivotally coupled to said box mounting plate by a living hinge with the device mounting plate and the box mounting plate being integrally formed; and
wherein said device mounting plate further comprises four embossed screw relief portions for covering the at least one screw when the device mounting plate is in a closed position relative to the box mounting plate.

15. The hinged mud ring electrical box cover of claim 14, further comprising:
wherein said device mounting plate is pivotally coupled to said box mounting plate by a integrally formed hinge or a hinge assembly operationally coupled to both the device mounting plate and the box mounting plate, wherein the hinge whether integrally formed or an assembly further comprises a spring member for biasing said device mounting plate in either an open or a closed position relative to said box mounting plate, and wherein the hinge further comprises a stop member to inhibit over-travel of the hinge.

16. A hinged mud ring electrical box cover comprising;

an electrical box assembly having a back wall and a perimeter wall extending substantially perpendicularly from said back wall; and a device mounting plate operationally coupleable to said electrical box assembly, said device mounting plate being coupled to an electrical device to be installed, said device mounting plate having a device access aperture therethrough for facilitating access to a back side of a device to be mounted to said device mounting plate, said device mounting plate further comprises a mud ring segment extending outwardly along a perimeter edge of said device access aperture, said device mounting plate further comprises a pair of device mounting flanges extending from opposite ends of said mud ring segment, at least one of said pair of device mounting flanges having a threaded aperture extending therethrough for receiving a mounting screw whereby a device is secured to said device mounting plate.

17. The hinged mud ring electrical box cover of claim 16, wherein said electrical box assembly further comprises a stud mounting segment for securing said box mounting plate to a stud or other support structure.

18. The hinged mud ring electrical box cover of claim 16, wherein said wherein said device mounting plate is pivotally coupled to said electrical box assembly by a integrally formed hinge, a hinge assembly operationally coupled to both the device mounting plate and the electrical box assembly, a tab and slot arrangement, or a living hinge with the device mounting plate and the electrical box assembly being integrally formed.

19. The hinged mud ring electrical box cover of claim 18, further comprising:

wherein said electrical box assembly further comprises a threaded aperture adjacent to an edge of the electrical box assembly;

wherein said device mounting plate further comprises an aperture adjacent to an edge of said device mounting plate and substantially aligned with said threaded aperture of said electrical box assembly when said device mounting plate is in a closed position relative to said electrical box assembly; and a screw positionable through the aperture of said device mounting plate and said threaded aperture of said electrical box assembly.

20. A method of using a hinged mud ring electrical box cover for the installation of an electrical device the steps comprising:

providing an electrical box mounted to a structure and having at least one electrical conductor;

providing a hinged mud ring electrical box cover, said hinged mud ring electrical box cover comprising:

a box mounting plate operationally coupleable to an electrical box, said box mounting plate having an access aperture therethrough for facilitating access to an interior of the electrical box when the box mounting plate is coupled to the electrical box;

a device mounting plate operationally coupleable to said box mounting plate, said device mounting plate further comprising a device mounting plate with a threaded aperture for operationally coupling an electrical device to said device mounting plate;

wherein said device mounting plate having a device access aperture therethrough for facilitating access to a back side of a device to be mounted to said device mounting plate and said device mounting plate further comprises a mud ring segment extending outwardly along a perimeter edge of said device access aperture;

wherein said device mounting plate further comprises a pair of device mounting flanges extending from opposite ends of said mud ring segment, at least one of said pair of device mounting flanges having a threaded aperture extending therethrough for receiving a mounting screw whereby a device is secured to said device mounting plate;

wherein said box mounting plate has four mounting slots or mounting apertures or combination thereof for coupling said box mounting plate to the electrical box with at least one screw;

wherein said device mounting plate is pivotally coupled to said box mounting plate by a integrally formed hinge, a hinge assembly operationally coupled to both the device mounting plate and the box mounting plate, a tab and slot arrangement, or a living hinge with the device mounting plate and the box mounting plate being integrally formed; and wherein said device mounting plate further comprises four embossed screw relief portions for covering the at least one screw of said mounting plate when the device mounting plate is in a closed position relative to the box mounting plate securing said hinged mud ring electrical box cover to said electrical box by securing said box mounting plate to said electrical box with one or more screws;

providing a device to be mounted to said device mounting plate and electrically connected to said at least one electrical conductor;

securing the device to said device mounting plate;

hingeably moving said device mounting plate to an open position relative to said box mounting plate;

electrically coupling the device to the at least one electrical conductor in the electrical box;

move said device mounting plate to a closed position relative to said box mounting plate;

secure said device mounting plate to said box mounting plate.

* * * * *